April 2, 1957     M. B. HASFJORD     2,787,307
METHOD OF MAKING PLUGS
Filed Oct. 7, 1954                         2 Sheets-Sheet 1
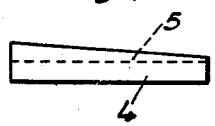
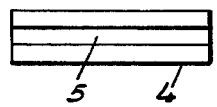
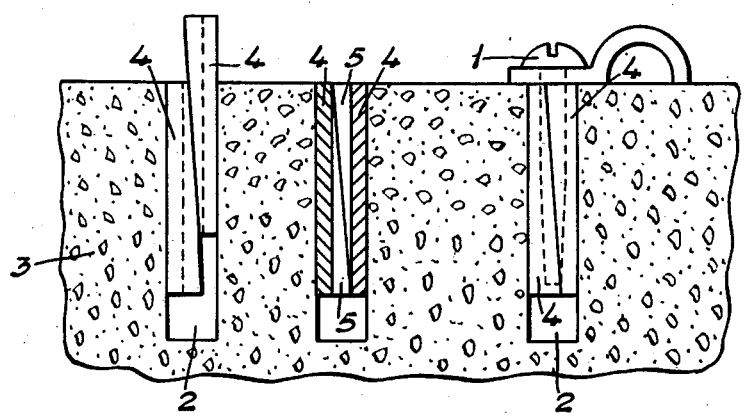
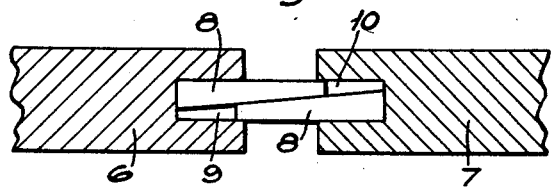
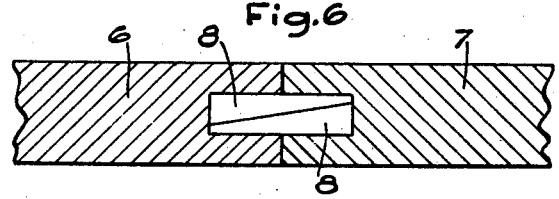

April 2, 1957   M. B. HASFJORD   2,787,307
METHOD OF MAKING PLUGS
Filed Oct. 7, 1954   2 Sheets-Sheet 2
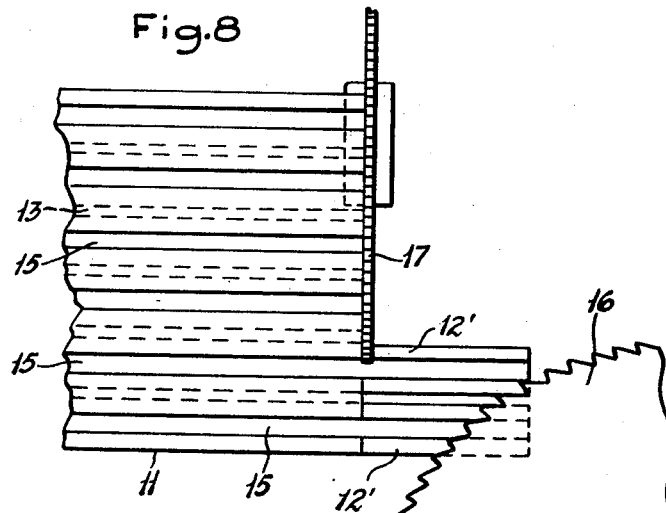
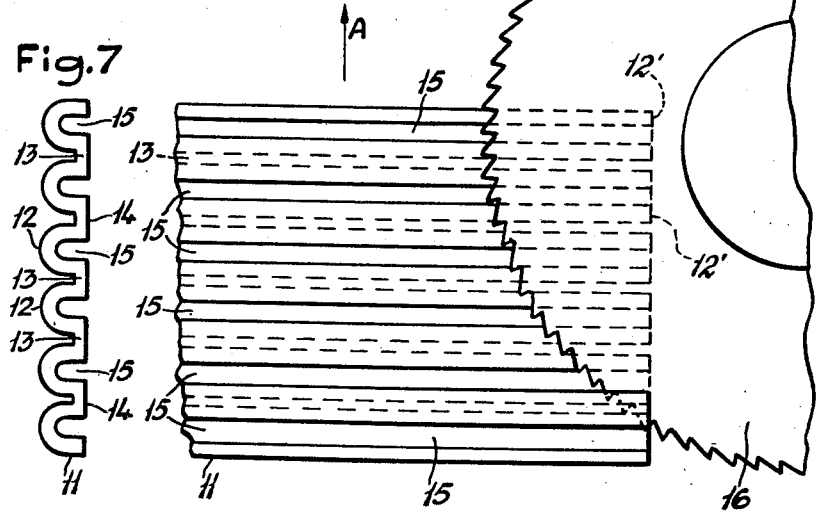
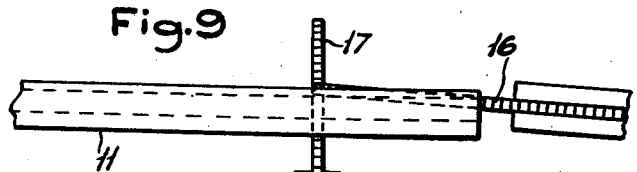
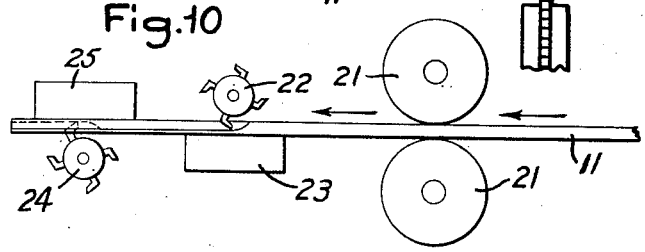

United States Patent Office 2,787,307
Patented Apr. 2, 1957

2,787,307
METHOD OF MAKING PLUGS
Morten Birger Hasfjord, Bofors, Flodafors, Sweden
Application October 7, 1954, Serial No. 460,795
Claims priority, application Sweden October 8, 1953
2 Claims. (Cl. 144—309)

The present invention relates to a method of making plugs of wood or, optionally, other materials which are elastic to a certain extent, said plugs being primarily intended to serve for securing screws and the like in walls and other objects made of stone, concrete, and so forth, and which may also advantageously be used for joining articles, such as boards, to one another. More particularly the invention relates to the manufacture of plugs which consist of two like members both of which have an approximately semi-circular cross section and are slightly thinner at one end than at the other so that each member is wedge-shaped. When the two members are inserted in a hole in the object or article, one after the other, with the thinner ends directed in opposite directions, the member last inserted effects wedging of the plug in the hole. When the plugs are to be used for securing screws or the like each plug member is provided in its flat face with a longitudinal groove in such manner that the grooves in the two associate plug members form together a central hole in the plug for receiving the screw.

The purpose of the present invention is to provide a method which renders it possible to manufacture plugs of this kind in large quantities in a simple and inexpensive manner. The method according to the invention consists in shaping, as by planing, cutting or molding, one face of a wooden board to a plurality of substantially parallel bead-like laths which are held together at the opposite substantially flat face of said board by thin and narrow connecting portions therein, each such lath having a cross section corresponding substantially to the predetermined cross section of the plug member and having a substantially U-shaped profile with a height at least equal to the predetermined height of the plug member at the thick end thereof, chamfering said substantially flat face of said board along one edge thereof transverse to the direction of said laths therein at such angle to said face of said board that the chamfered end portions of said laths obtain the predetermined wedge shape of the plug member and over a distance from said edge that is at least equal to the predetermined length of the plug member and to at least such depth beneath said face of said board as to cut away the connecting portions between said laths thereby separating said chamfered end portions of said laths from one another, and cutting said board transversely to the direction of said laths therein at a distance from said edge of said board equal to the predetermined length of the plug member to separate the wedge-shaped end portions of said laths from the remainder of said board. The method according to the invention may also include the step of cutting grooves in the substantially flat face of the board parallel to and opposite the beadlike laths therein.

The method according to this invention as applied to making plugs of wood will now be described, reference being had to the accompanying drawings in which Fig. 1 shows a side view of a plug member provided with a groove, Fig. 2 shows a plan view of said plug member, and Fig. 3 shows the plug member viewed toward its smaller end. Fig. 4 illustrates the manner in which a plug comprising two such plug members is inserted and wedged in a hole in a stone wall. Figs. 5 and 6 illustrate a plug for joining two boards to one another before and after the plug is wedged fast in said boards. Fig. 7 shows an end view of a wooden board shaped to a plurality of connected laths or strips which constitute blanks from which the plug members are made. Figs. 8 and 9 show said wooden board in plan view and side view, respectively, and illustrate schematically the manner in which the present method may be carried out and apparatus that may be used therefor. Fig. 10 is a diagrammatic view illustrating a suitable manner of shaping a wooden board into the blank illustrated in Fig. 7.

The plug member shown in Figs. 1, 2, and 3, which forms one half of a plug to be used, for instance, for securing a screw 1 in a hole 2 in a stone or brick wall 3, as illustrated in Fig. 4, consists of a straight staff 4 of wood or similar material, said staff having an approximately semi-circular cross section and being provided in its flat face, which is the upper face as viewed in Fig. 1, with a longitudinal groove 5 which extends along the entire length of the staff. The flat face of the staff 4 is inclined to the axis thereof in such manner that one end of the staff is somewhat thinner than the other end, thus making the staff wedge-shaped. The said inclined flat face may suitably form an angle of about 3° with the axis of the staff 4, and may be cut in such manner that the outer profile of the staff forms a semi-circle at a point that is positioned near the middle of the staff though slightly nearer to the thin end than to the thick end of the staff, so that the outer profile comprises slightly more than a semi-circle at the thick end, and slightly less than half a circle at the thin end. Thus, when two such plug members are placed together with the flat surfaces against one another and the thinner ends directed in opposite directions, the composite plug will obtain a somewhat elliptic cross section having the transverse axis of the ellipse approximately at right angles to the flat surfaces. By this arrangement the advantage is attained that the plug members can be more easily inserted in a hole of the diameter for which the plug is intended.

When a plug of the character described is to be inserted in a hole 2, Fig. 4, one of the plug members 4 is first inserted in the hole to the desired depth thereof, with its thick end first, as shown to the left in Fig. 4 and it is not necessary to push said member down to the bottom of the hole, if the hole happens to have a greater depth than the length of the plug. The second plug member 4 is then inserted with its thin end first in the hole alongside the first plug member, and is driven in, for instance by striking it a few times with a hammer. In this way the plug is wedged in the hole and is securely fastened therein at the desired place, as shown in the center and to the right in Fig. 4. The grooves 5 in the two plug members form together a central through hole into which the screw 1 may be screwed.

The plug illustrated in Figs. 5 and 6, which is intended for joining two boards 6 and 7 to one another, differs from the plug above described only in that the plug members 8 are not provided with grooves in their flat faces, as such grooves are superfluous. Also in this case, however, it is of course possible to use plug members having groove which may be filled with glue in order to provide a still more secure joint. In the edge faces of the two boards 6 and 7 which are to be joined to one another, holes 9 and 10, respectively, are bored in the ordinary manner. The depth of the said holes should be equal to half the length of the plug members. One plug member 8 is then pushed with its thick ends first into the hole 9 in the board 6, and the other plug member 8 is pushed into the hole 10 in the board 7, also with its thick ends first, after which the boards are moved against one another so that the projecting thin ends of the plug members enter the holes in the opposite board. When afterwards the two boards are forced against one another the plug members are wedged fast in the two holes so that the desired rigid joint is obtained.

The making of the plug members above described is illustrated in Figs. 7, 8, 9, and 10. A wooden board 11 of the required thickness is shaped, as by planing, cutting or molding one face thereof, to a plurality of substantially parallel beadlike laths or strips 12 which constitute blanks from which the plug members are made.

As illustrated in Fig. 10, the shaping of the board 11 may be effected by feeding the board, as by means of feed rolls 21, toward a rotary cutter head 22 below which the board is supported by a stationary bed 23 while moving past the cutter head. The latter is provided with knives suitably formed to shape the upper surface of the board of the above-mentioned laths or strips 12, Fig. 7, in such manner that said laths 12 are held together at the opposite substantially flat face 14 of the board by thin and narrow connecting portions 13 therein, as illustrated in Fig. 7, When, as in the instance illustrated, the plugs produced are to be used for securing screws in a wall or the like, as above explained, the board 11 is fed toward a secondary rotary cutter head 24, Fig. 10, while the upper surface of the board 11 bears against a stationary bed 25. The rotary cutter head 24 is provided with a set of knives suitably formed to shape longitudinal grooves 15, Fig. 7, in the said flat face 14 of the board parallel to and opposite the bead-like laths 12.

As shown in Fig. 7, each lath or strip 12 has a cross section which corresponds substantially to the predetermined cross section of the plug member to be made, and a substantially U-shaped profile. The connecting portions 13 should in practice have a thickness of at least 1 mm. and a width between the laths 12 of at least 0.5 to 1 mm. to make it possible to use suitable cutting tools. Owing to these connecting portions 13 the height of the profile of the laths 12 as measured in the direction of thickness of the board, is somewhat greater than the thickness or height that the plug members are required to have at their thick ends. The wooden board 11 thus shaped and grooved is then placed on a supporting table or the like, not shown in the drawing, on which it is fed in the direction of the arrow A in Fig. 8, i. e. in a direction transverse to the longitudinal direction of the laths 12, toward and past a first circular saw blade 16 the axis of rotation of which is slightly inclined in such manner that the saw blade rotates in a plane that forms an angle to the surface of the supporting table, and thus to the two surfaces of the board 11, that is equal to the desired wedge angle of the plug member to be made. Therefore, when the board 11 is fed toward and past the rotary saw blade 16, as shown in Fig. 8, the saw blade will chamfer the upper flat face 14 of said board 11 along the forward edge thereof which is transverse to the direction of the laths 12, in such a way that the chamfered end portions of said laths obtain the predetermined wedge shape of the plug member, as will be apparent from Fig. 9. The saw blade 16 and the supporting table for the wooden board 11, and the position of said board relatively to the saw blade, are so adjusted relatively to one another that during this chamfering operation the said laths 12 are chamfered over a distance from the transverse edge of the board that is at least equal to the predetermined length of the plug member, and to at least such depth beneath the upper face 14 of the board 11 that the connecting portions 13 between the laths 12 are cut away, so that the chamfered end portions 12' of said laths 12 are separated from one another. During the continued motion of the board 11 in the above mentioned direction A, the board is fed against a second circular saw blade 17 which rotates about an axis parallel with the longitudinal direction of the laths 12, and which cuts off the protruding wedge-shaped chamfered end portions thus separated from one another at a distance from the above mentioned edge of the board, that is to say a distance from the ends of said chamfered end portions, that is equal to the predetermined length of the plug members, whereby said chamfered end portions of the laths are separated from the remainder of the board 11. In this way the completed wedge-shaped plug members are directly obtained. The operation described is then repeated until the entire board 11 has been cut to plug members.

It will be appreciated from the above description that the entire production of the wedge-shaped plug members can be carried out by a mechanical process and by means of simple machines which renders the production very inexpensive.

I claim:

1. The method of making plug members of the character described, which consists in shaping one face of a wooden board to a plurality of substantially parallel beadlike laths which are held together at the opposite substantially flat face of said board by thin and narrow connecting portions therein, each such lath having a cross section corresponding substantially to the predetermined cross section of the plug member and having a substantially U-shaped profile with a height at least equal to the predetermined height of the plug member at the thick end thereof, chamfering said substantially flat face of said board along one edge thereof transverse to the direction of said laths therein at such angle to said face of said board that the chamfered end portions of said laths obtain the predetermined wedge shape of the plug member and over a distance from said edge that is at least equal to the predetermined length of the plug member and to at least such depth beneath said face of said board as to cut away the connecting portions between said laths thereby separating said chamfered end portions of said laths from one another, and cutting said board transversely to the direction of said laths therein at a distance from said edge of said board equal to the predetermined length of the plug member to separate the wedge-shaped end portions of said laths from the remainder of said board.

2. The method of making plug members of the character described, which consists in shaping one face of a wooden board to a plurality of substantially parallel beadlike laths which are held together at the opposite substantially flat face of said board by thin and narrow connecting portions therein, each such lath having a cross section corresponding substantially to the predetermined cross section of the plug member and having a substantially U-shaped profile with a height at least equal to the predetermined height of the plug member at the thick end thereof, cutting grooves in said substantially flat face of said board parallel to and opposite the beadlike laths therein, chamfering said substantially flat face of said board along one edge thereof transverse to the direction of said laths therein at such angle to said face of said board that the chamfered end portions of said laths obtain the predetermined wedge shape of the plug member and over a distance from said edge that is at least equal to the predetermined length of the plug member and to at least such depth beneath said face of said board as to cut away the connecting portions between said laths thereby separating said chamfered end portions of said laths from one another, and cutting said board transversely to the direction of said laths therein at a distance from said edge of said board equal to the predetermined length of the plug member to separate the wedge-shaped end portions of said laths from the remainder of said board.

References Cited in the file of this patent

UNITED STATES PATENTS

| | | |
|---|---|---|
| 1,191,689 | Goldsmith | July 18, 1916 |
| 2,055,401 | Carlson | Sept. 22, 1936 |